US010287465B2

(12) United States Patent
Tanaka et al.

(10) Patent No.: US 10,287,465 B2
(45) Date of Patent: May 14, 2019

(54) PRESSURE-SENSITIVE ADHESIVE LAYER, PRESSURE-SENSITIVE ADHESIVE TAPE, AND DOUBLE-SIDED PRESSURE-SENSITIVE ADHESIVE TAPE

(71) Applicant: NITTO DENKO CORPORATION, Ibaraki-shi, Osaka (JP)

(72) Inventors: Akiko Tanaka, Ibaraki (JP); Shigeki Ishiguro, Ibaraki (JP); Satomi Yoshie, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/772,990

(22) PCT Filed: Mar. 4, 2014

(86) PCT No.: PCT/JP2014/055450
§ 371 (c)(1),
(2) Date: Sep. 4, 2015

(87) PCT Pub. No.: WO2014/136765
PCT Pub. Date: Sep. 12, 2014

(65) Prior Publication Data
US 2016/0017193 A1     Jan. 21, 2016

(30) Foreign Application Priority Data

Mar. 5, 2013   (JP) .................................. 2013-043198
Mar. 5, 2013   (JP) .................................. 2013-043199

(51) Int. Cl.
C09J 7/20      (2018.01)
C09J 7/38      (2018.01)
(Continued)

(52) U.S. Cl.
CPC ............. *C09J 167/02* (2013.01); *C08K 5/101* (2013.01); *C09J 7/20* (2018.01); *C09J 7/38* (2018.01);
(Continued)

(58) Field of Classification Search
None
See application file for complete search history.

(56) References Cited

U.S. PATENT DOCUMENTS

2004/0076768 A1    4/2004   Kamiya
2005/0202238 A1    9/2005   Kishioka
(Continued)

FOREIGN PATENT DOCUMENTS

JP    2002-249741      9/2002
JP    2004-231797      8/2004
(Continued)

OTHER PUBLICATIONS

Machine translation JP 2010/095672 A (2010).*
(Continued)

*Primary Examiner* — Frank D Ducheneaux
(74) *Attorney, Agent, or Firm* — Knobbe Martens Olson & Bear LLP

(57) ABSTRACT

The purpose of the present invention is to provide: a polyester-based pressure-sensitive adhesive layer, for which a pressure-sensitive adhesive composition (pressure-sensitive adhesive solution) without any acrylic pressure-sensitive adhesive or the like which needs a large amount of an organic solvent and is difficult to apply thickly; to provide a polyester-based pressure-sensitive adhesive layer that is friendly to the global environment, can be applied thickly, has a high level of cost effectiveness and workability, and also has a high level of adhesion, retention, and repulsion resistance; and to provide a pressure-sensitive adhesive tape (Continued)

or double-sided pressure-sensitive adhesive tape having such a pressure-sensitive adhesive layer. The invention is directed to a polyester-based pressure-sensitive adhesive layer including a product made from a polyester-based pressure-sensitive adhesive composition including: a polyester obtained by polycondensation of at least a dicarboxylic acid component and a diol component; and a tackifier, the polyester-based pressure-sensitive adhesive layer having a gel fraction of 15% by weight or more to less than 40% by weight.

11 Claims, 1 Drawing Sheet

(51) Int. Cl.
*C09J 9/00* (2006.01)
*C09J 11/06* (2006.01)
*C09J 11/08* (2006.01)
*C09J 167/02* (2006.01)
*C08K 5/101* (2006.01)

(52) U.S. Cl.
CPC ............ *C09J 9/00* (2013.01); *C09J 11/06* (2013.01); *C09J 11/08* (2013.01); *C09J 2201/128* (2013.01); *C09J 2201/606* (2013.01); *C09J 2205/102* (2013.01); *C09J 2400/20* (2013.01); *C09J 2467/00* (2013.01); *C09J 2493/00* (2013.01)

(56) References Cited

U.S. PATENT DOCUMENTS

| | | | | |
|---|---|---|---|---|
| 2007/0218276 | A1* | 9/2007 | Hiramatsu | C09J 7/385 428/354 |
| 2010/0255241 | A1* | 10/2010 | Wada | C09J 7/0217 428/41.8 |
| 2010/0255253 | A1* | 10/2010 | Kishioka | C09J 133/08 428/141 |
| 2011/0091716 | A1 | 4/2011 | Yoshie | |
| 2012/0208016 | A1* | 8/2012 | Takahira | B32B 27/00 428/355 R |
| 2012/0208955 | A1* | 8/2012 | Yoshie | C08G 18/4233 524/604 |
| 2012/0232226 | A1* | 9/2012 | Takahira | C09J 167/08 525/451 |
| 2012/0244328 | A1* | 9/2012 | Tanimura | C08G 18/4288 428/213 |

FOREIGN PATENT DOCUMENTS

| | | | | |
|---|---|---|---|---|
| JP | 2005-255877 | | 9/2005 | |
| JP | 2006-131705 | | 5/2006 | |
| JP | 2008-013593 | | 1/2008 | |
| JP | 2009040849 A | * | 2/2009 | ............ C09J 167/00 |
| JP | 2009-221440 | | 10/2009 | |
| JP | 2009-280688 | | 12/2009 | |
| JP | 2010-095672 | | 4/2010 | |
| WO | WO 2011/055827 A1 | * | 5/2011 | ............ C09J 167/00 |
| WO | WO 2011/068102 A1 | * | 6/2011 | ................ C09J 7/00 |

OTHER PUBLICATIONS

Human translation of JP 2009040849A (2009).*
International Preliminary Report on Patentability, dated Sep. 17, 2015, for International Application No. PCT/JP2014/055450, including translation of the Written Opinion by the International Bureau.
Japanese Office Action, dated Jan. 6, 2017, in corresponding Japanese Patent Application No. 2013-043198.
Japanese Office Action, dated Jan. 6, 2017, in corresponding Japanese Patent Application No. 2013-043199.
Chinese Office Action, dated Dec. 30, 2016, in corresponding Chinese Patent Application No. 201480012174.8.
Taiwanese Office Action, dated May 19, 2017, in corresponding Taiwanese Patent Application No. 103107396.

* cited by examiner

PRESSURE-SENSITIVE ADHESIVE LAYER, PRESSURE-SENSITIVE ADHESIVE TAPE, AND DOUBLE-SIDED PRESSURE-SENSITIVE ADHESIVE TAPE

TECHNICAL FIELD

The invention relates to a polyester-based pressure-sensitive adhesive layer, a polyester-based pressure-sensitive adhesive tape, and a polyester-based double-sided pressure-sensitive adhesive tape.

BACKGROUND ART

Pressure-sensitive adhesive tapes and sheets produced with pressure-sensitive adhesive compositions conventionally used can form a bond at room temperature when a force on the order of a finger pressure is applied to them. Therefore, they are used in a wide variety of fields such as bonding, wrapping, surface protection, and electrical insulation. Particularly in bonding applications, good adhesion is often required for reliability and safety.

In recent years, for example, cellular phones, digital cameras, PDAs, digital video cameras, and other OA devices, and electronic components (particularly mobile devices) have increased in functionality and decreased in size and thickness as they have become widespread and increased in production. For example, cellular phones as typical mobile devices tend to have thinner main components so that they can be easier to carry and have a wider display screen.

In general, a display part composed mainly of an LCD module and a backlight unit has various many sheet-shaped components (placed on one another) for performing functions such as light emission, reflection, light shielding, and light guiding. Double-sided pressure-sensitive adhesive tapes and the like are used in assembling (bonding) these components (see Patent Document 1).

Silicone-based pressure-sensitive adhesives, acrylic pressure-sensitive adhesives, and the like are typically used as raw materials for double-sided adhesive tapes. Unfortunately, silicone-based pressure-sensitive adhesives are problematic in that they are expensive and less economical.

Pressure-sensitive adhesive sheets are also used in assembling (bonding) of mobile device components and in boding of an optical member such as a lens (e.g., a glass or plastic lens), a prism, a reflector, a compensation plate, or a polarizing plate. Acrylic pressure-sensitive adhesives are mainly used for such pressure-sensitive adhesive sheets (see Patent Documents 1 and 2).

In recent years, as parts and components have decreased in size and thickness, pressure-sensitive adhesive tapes have become required to have high adhesion even to a small area. For design features and the like, more components are having a curved surface, which creates a demand for high adhesion reliability during bonding to such a curved surface.

However, for example, when the acrylic pressure-sensitive adhesives are used, a large amount of organic solvents, which have been used to form the adhesives, need to be removed by heating and drying, which reduces the workability and may have an adverse effect on the environment. In addition, when pressure-sensitive adhesive tapes are produced using an acrylic pressure-sensitive adhesive solution containing a large amount of an organic solvent, it is difficult to form pressure-sensitive adhesive layers by thick coating, which causes a problem in that their applications will be limited due to limitations on the thickness of pressure-sensitive adhesive layers.

Although inexpensive, acrylic pressure-sensitive adhesives may contribute to the problem of petroleum resources depletion because petroleum is often used as a raw material for them. In addition, carbon dioxide is emitted in the process of disposal of acrylic pressure-sensitive adhesives after use, which is not global-environmentally conscious. There has been a demand for measures against global warming.

PRIOR ART DOCUMENTS

Patent Documents

Patent Document 1: JP-A-2002-249741
Patent Document 2: JP-A-2005-255877

SUMMARY OF THE INVENTION

Problems to be Solved by the Invention

In view of the above circumstances, it is therefore an object of the invention to prepare a pressure-sensitive adhesive composition (pressure-sensitive adhesive solution) without any acrylic pressure-sensitive adhesive or the like which needs a large amount of an organic solvent and is difficult to apply thickly; to provide a polyester-based pressure-sensitive adhesive layer that is friendly to the global environment, can be applied thickly, has a high level of cost effectiveness and workability, and also has a high level of adhesion, retention, and repulsion resistance; and to provide a pressure-sensitive adhesive tape or double-sided pressure-sensitive adhesive tape having such a pressure-sensitive adhesive layer.

Means for Solving the Problems

As a result of earnest studies to solve the above problems, the inventors have created the polyester-based pressure-sensitive adhesive layer, pressure-sensitive adhesive tape, and double-sided pressure-sensitive adhesive tape shown below and accomplished the invention.

Specifically, the invention is directed to a polyester-based pressure-sensitive adhesive layer including a product made from a polyester-based pressure-sensitive adhesive composition including: a polyester obtained by polycondensation of at least a dicarboxylic acid component and a diol component; and a tackifier, the polyester-based pressure-sensitive adhesive layer having a gel fraction of 15% by weight or more to less than 40% by weight.

The polyester-based pressure-sensitive adhesive layer of the invention is preferably such that the diol component contains 1.04 to 2.10 moles of hydroxyl groups per mole of carboxyl groups in the dicarboxylic acid component.

In the polyester-based pressure-sensitive adhesive layer of the invention, the polyester preferably has a weight average molecular weight (Mw) of 5,000 to 60,000.

The polyester-based pressure-sensitive adhesive layer of the invention is preferably such that the dicarboxylic acid component and the diol component each include a plant-derived raw material as a main component.

In the polyester-based pressure-sensitive adhesive layer of the invention, the tackifier preferably includes a plant-derived raw material as a main component, and the tackifier preferably has a softening point of 100 to 170° C.

The polyester-based pressure-sensitive adhesive layer of the invention is preferably such that the composition includes 100 parts by weight of the polyester and 20 to 90 parts by weight of the tackifier.

The polyester-based pressure-sensitive adhesive layer of the invention preferably has an adhering strength of 7 N/20 mm or more to a polycarbonate plate.

The polyester-based pressure-sensitive adhesive layer of the invention preferably has an adhering strength of 6.5 N/20 mm or more to a SUS plate.

The polyester-based pressure-sensitive adhesive layer of the invention preferably has a holding power of 0.8 mm/60 minutes or less at 40° C.

The polyester-based pressure-sensitive adhesive layer of the invention preferably further includes a release liner provided on at least one side.

The invention is also directed to a polyester-based pressure-sensitive adhesive tape preferably including the polyester-based pressure-sensitive adhesive layer and a support provided on at least one side of the polyester-based pressure-sensitive adhesive layer.

The invention is also directed to a polyester-based double-sided pressure-sensitive adhesive tape preferably including: at least two polyester-based pressure-sensitive adhesive layers; and a support provided on at least one side of the polyester-based pressure-sensitive adhesive layer.

Effect of the Invention

The polyester-based pressure-sensitive adhesive layer of the invention, which is produced with a polyester-based pressure-sensitive adhesive, has the following advantageous effects. The polyester-based pressure-sensitive adhesive layer of the invention can be produced without any expensive silicone-based pressure-sensitive adhesive or any petroleum-derived acrylic pressure-sensitive adhesive or the like. The polyester to be used for the polyester-based pressure-sensitive adhesive generally has a molecular weight lower than that of acryl-based polymers used in acrylic pressure-sensitive adhesives and therefore can form a coating liquid (pressure-sensitive adhesive solution) with a higher polymer concentration. The polyester-based pressure-sensitive adhesive layer of the invention is useful in that it can be applied thickly with a smaller amount of an organic solvent, is friendly to the global environment, has a high level of cost effectiveness and workability, and also has a high level of adhesion, retention, and repulsion resistance.

MODE FOR CARRYING OUT THE INVENTION

Hereinafter, embodiments of the invention will be described in detail.

<Polyester-Based Pressure-Sensitive Adhesive Layer>

The polyester-based pressure-sensitive adhesive layer of the invention (hereinafter also simply referred to as the pressure-sensitive adhesive layer) includes a product made from a polyester-based pressure-sensitive adhesive composition and has a gel fraction of 15% by weight or more to less than 40% by weight, wherein the polyester-based pressure-sensitive adhesive composition includes a polyester obtained by polycondensation of at least a dicarboxylic acid component and a diol component; and a tackifier.

<Polyester-Based Pressure-Sensitive Adhesive Tape and Polyester-Based Double-Sided Pressure-Sensitive Adhesive Tape>

Figure 1:
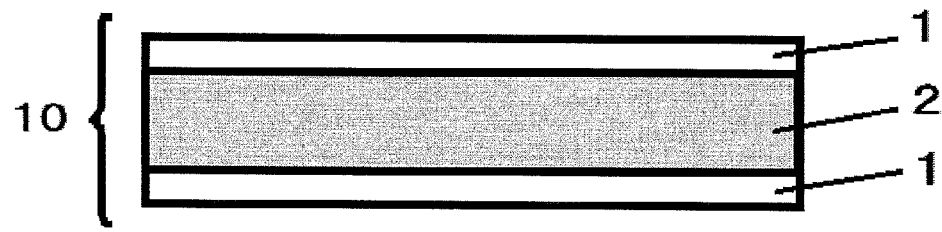
FIG. 1 is a diagram showing the state of a double-sided pressure-sensitive adhesive tape including a pressure-sensitive adhesive layer and release liners attached to both surfaces of the pressure-sensitive adhesive layer.
Figure 2:
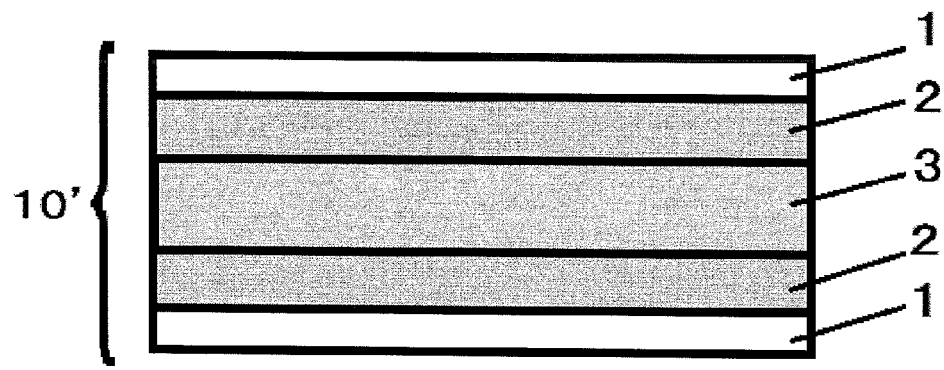
FIG. 2 is a diagram showing the state of a double-sided pressure-sensitive adhesive tape including a support, pressure-sensitive adhesive layers provided on both surfaces of the support, and a release liner attached to the surface of each pressure-sensitive adhesive layer.
Figure 3:
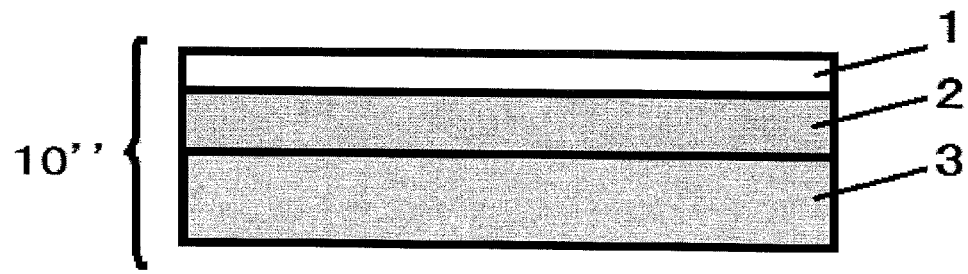
FIG. 3 is a diagram showing the state of a pressure-sensitive adhesive tape including a pressure-sensitive adhesive layer, a release liner provided on one side of the pressure-sensitive adhesive layer, and a support provided on the other side of the pressure-sensitive adhesive layer.

The pressure-sensitive adhesive tape or the double-sided pressure-sensitive adhesive tape according to the invention may be of any type as long as it has the pressure-sensitive adhesive layer stated above. FIG. 1 shows an example of the pressure-sensitive adhesive tape or the double-sided pressure-sensitive adhesive tape, which includes a pressure-sensitive adhesive layer and release liners attached to both sides of the pressure-sensitive adhesive layer (with no support). FIG. 2 shows another example of the tape, which includes a support, pressure-sensitive adhesive layers provided on both surfaces of the support, and a release liner attached to the surface of each pressure-sensitive adhesive layer (with a support). FIG. 3 shows a further example of the tape, which includes a pressure-sensitive adhesive layer, a support provided on one side of the pressure-sensitive adhesive layer, and a release liner attached to the other side of the pressure-sensitive adhesive layer. The pressure-sensitive adhesive layer may be a stack (laminate) of two or more pressure-sensitive adhesive sub-layers bonded together and made of the same or different materials. The double-sided pressure-sensitive adhesive tape may include two or more support layers and three or more pressure-sensitive adhesive layers. The polyester-based pressure-sensitive adhesive tape and the polyester-based double-sided pressure-sensitive adhesive tape will also be simply referred to as the pressure-sensitive adhesive and the double-sided pressure-sensitive adhesive tape, respectively, and the pressure-sensitive adhesive tape and the double-sided pressure-sensitive adhesive tape will also be generically referred to as the pressure-sensitive adhesive tape.

The invention makes it possible to avoid the use of expensive silicone-based pressure-sensitive adhesives or petroleum-derived acrylic pressure-sensitive adhesives and the like, which have a high solvent content and are difficult to apply thickly. The invention also makes it possible to obtain a pressure-sensitive adhesive layer that is friendly to the global environment and can help reduce the problem of fossil resource depletion or carbon dioxide emission; has a low solvent content and can be applied thickly; has high cost effectiveness and good workability; and also has a high level of adhesion, retention, and repulsion resistance. The invention also makes it possible to obtain a pressure-sensitive adhesive tape and a double-sided pressure-sensitive adhesive tape each including such a pressure-sensitive adhesive layer. The polyester-based pressure-sensitive adhesive generally has a high level of electrical insulating properties, mechanical strength, bending fatigue strength, water and chemical resistance, and optical transparency and also hardly expands or contracts. In particular, the polyester-based pressure-sensitive adhesive can be applied both thickly and thinly and therefore used in a variety of applications. In particular, the polyester-based pressure-sensitive adhesive is suitable for applications for insulating and fixing electronic and electric devices.

<Polyester-Based Pressure-Sensitive Adhesive>

A polyester obtained by polycondensation of at least a dicarboxylic acid component and a diol component is used to form the pressure-sensitive adhesive layer (pressure-sensitive adhesive tape). The polyester may be synthesized by any known polymerization techniques.

In a preferred mode, the polyester is produced from plant-derived raw materials. This is because plant-derived raw materials, which are said to be carbon neutral, can be used to produce global environment-friendly or environmentally compatible pressure-sensitive adhesives.

The polyester includes at least a dicarboxylic acid component. The dicarboxylic acid component is preferably derived from a molecule having two carboxyl groups. The dicarboxylic acid component is more preferably derived from a material including a plant-derived raw material as a main component. The term "a material including a plant-derived raw material as a main component" means that what is called the biomass ratio is high, and the term "main component" means that the plant-derived raw material makes up the largest part of all the raw materials used to form the polyester.

In the invention, the biomass ratio is the ratio of the weight of the plant-derived raw material used in the production of the pressure-sensitive adhesive layer to the total weight of the pressure-sensitive adhesive layer. The biomass ratio is calculated from the following formula:

The biomass ratio (% by weight) of the pressure-sensitive adhesive layer=100×[the weight (g) of the plant-derived raw material]/[the total weight (g) of the pressure-sensitive adhesive layer]

The biomass ratio is preferably 50% by weight or more, more preferably 60% by weight or more, even more preferably 70% by weight or more. The pressure-sensitive adhesive obtained with a high biomass ratio of 50% by weight or more is environmentally compatible or friendly to the global environment, which is a preferred mode.

Examples of the dicarboxylic acid include, but are not limited to, plant-derived dicarboxylic acids such as sebacic acid derived from castor oil and dimer acids derived from oleic acid, erucic acid, or the like; and other dicarboxylic acids such as aliphatic or alicyclic dicarboxylic acids such as adipic acid, azelaic acid, 1,4-cyclohexanedicarboxylic acid, 4-methyl-1,2-cyclohexanedicarboxylic acid, dodecenyl succinic anhydride, fumaric acid, succinic acid, dodecanedioic acid, hexahydrophthalic anhydride, tetrahydrophthalic anhydride, maleic acid, maleic anhydride, itaconic acid, and citraconic acid; and terephthalic acid, isophthalic acid, orthophthalic acid, 1,5-naphthalenedicarboxylic acid, 2,6-naphthalenedicarboxylic acid, 4,4'-diphenyldicarboxylic acid, 2,2'-diphenyldicarboxylic acid, and 4,4'-diphenyl ether dicarboxylic acid. In particular, dimer acids and the like are preferred because they can be derived from plants and therefore friendly to the global environment. These dicarboxylic acids may be used alone or in combination of two or more.

In addition to the dicarboxylic acid, a tricarboxylic acid containing three or more carboxyl groups may also be used. However, when a polyfunctional carboxylic acid such as a tricarboxylic acid is used, a network structure (three-dimensional crosslinked structure) can be formed so that the adhering strength (adhesive strength) of the pressure-sensitive adhesive layer (pressure-sensitive adhesive tape) can be kept low. Therefore, when high adhesion is necessary, the tricarboxylic acid and the like should preferably not be used.

The polyester includes a diol component. The diol component is preferably derived from a molecule having at least two hydroxyl (hydroxy) groups. The diol component is more preferably derived from a material including a plant-derived raw material as a main component.

Examples of the diol component include, but are not limited to, plant-derived diols such as fatty acid esters derived from castor oil, dimer diols derived from oleic acid, erucic acid, or the like, and glycerol monostearate; and other diols including aliphatic glycols such as ethylene glycol, 1,2-propylene glycol, 1,3-propanediol, 2-methyl-1,3-propanediol, 1,2-butanediol, 1,3-butanediol, 1,4-butanediol, 1,5-pentanediol, 1,6-hexanediol, 3-methyl-1,5-pentanediol, neopentyl glycol, diethylene glycol, dipropylene glycol, 2,2,4-trimethyl-1,5-pentanediol, 2-ethyl-2-butylpropanediol, 1,9-nonanediol, 2-methyloctanediol, 1,10-decanediol, 1,4-cyclohexanedimethanol, and 1,2-cyclohexanedimethanol; and diols other than the aliphatic glycols, such as ethylene oxide adducts of bisphenol A, propylene oxide adducts of bisphenol A, ethylene oxide adducts of hydrogenated bisphenol A, propylene oxide adducts of hydrogenated bisphenol A, polytetramethylene glycol, polypropylene glycol, polyethylene glycol, and polycarbonate glycol. In particular, plant-derived aliphatic diols are preferred because they are friendly to the global environment. These diols may be used alone or in combination of two or more.

The molar ratio of the carboxylic acid component to the diol component is preferably 1:1.04 to 2.10, more preferably 1:1.06 to 1.70, even more preferably 1:1.07 to 1.30. If the molar ratio is lower than 1:1.04, the resulting polyester can have a higher molecular weight and a smaller number of hydroxyl groups as functional groups, so that the crosslinking reaction of the polyester can be difficult to speed up even when a crosslinking agent (such as a polyfunctional isocyanate) is used, which can make it impossible to obtain a pressure-sensitive adhesive layer with a desired gel fraction. In this case, the pressure-sensitive adhesive (layer) may fail to have a sufficient holding power (cohesive strength). On the other hand, if the molar ratio is more than 1:2.10, only a polyester with a molecular weight smaller than the desired value will tend to form. That is not preferred because gelation of such a polyester cannot be facilitated even when a crosslinking agent is used, so that it will be impossible to obtain a pressure-sensitive adhesive layer having a desired gel fraction.

The polyester used to form the pressure-sensitive adhesive layer (pressure-sensitive adhesive composition) of the invention preferably has a weight average molecular weight (Mw) of 5,000 to 60,000, more preferably 8,000 to 50,000, even more preferably 15,000 to 45,000. If the weight average molecular weight is less than 5,000, the pressure-sensitive adhesive including the polyester can have lower adhering strength (adhesive strength) or holding power (cohesive strength), so that the resulting pressure-sensitive adhesive tape (pressure-sensitive adhesive layer) itself cannot be secured to components or other adherends in some cases. If the weight average molecular weight is more than 60,000, the content of hydroxyl groups as functional groups in the polyester will be relatively low, so that the crosslinking reaction of the polyester can be difficult to speed up even when a crosslinking agent (such as a polyfunctional isocyanate) is used, which can make it impossible to obtain a pressure-sensitive adhesive layer with a desired gel fraction, and therefore is not preferred. The polyester used in the invention has a molecular weight lower than that of acryl-based polymers used in acrylic pressure-sensitive adhesives. Using the polyester, therefore, a coating liquid (pressure-sensitive adhesive solution) with a higher polymer concentration can be prepared, which can be applied thickly to form a thick pressure-sensitive adhesive layer. Therefore, such a coating liquid can be used in a wide variety of applications and is useful.

An additional component other than the carboxylic acid component and the diol component may be introduced into the polyester by polymerization or addition after the polymerization as long as it does not degrade the properties of the polyester to be used in the pressure-sensitive adhesive layer (pressure-sensitive adhesive tape) of the invention.

In the invention, the polymerization (polycondensation) reaction of the dicarboxylic acid component and the diol component may be performed by a conventionally known method with or without a solvent.

The method for removing water produced in the polymerization (polycondensation) reaction may be a method of removing water by azeotrope with toluene or xylene, a method of blowing inert gas into the reaction system so that the produced water and monoalcohol can be discharged together with the inert gas to the outside of the reaction system, a method of removing water by distillation under reduced pressure, or the like.

Any polymerization catalyst generally used for polyester may be used in the polymerization (polycondensation) reaction. Examples of polymerization catalysts that may be used include, but are not limited to, various metal compounds such as titanium compounds, tin compounds, antimony compounds, zinc compounds, and germanium compounds, and strong acid compounds such as p-toluenesulfonic acid and sulfuric acid.

<Crosslinking Agent>

The pressure-sensitive adhesive tape (pressure-sensitive adhesive composition) of the invention may contain a crosslinking agent. The pressure-sensitive adhesive composition containing the crosslinking agent can form a pressure-sensitive adhesive layer by a crosslinking reaction. The crosslinking agent may be any conventionally known crosslinking agent such as a polyvalent isocyanurate, a polyfunctional isocyanate, a polyfunctional melamine compound, a polyfunctional epoxy compound, a polyfunctional oxazoline compound, a polyfunctional aziridine compound, a metal chelate compound, or the like. Particularly in view of versatility, a polyvalent isocyanurate or a polyfunctional isocyanate compound is preferably used. These crosslinking agents may be used alone or in combination of two or more.

Examples of the polyvalent isocyanurate include a polyisocyanurate of hexamethylene diisocyanate and the like. The polyvalent isocyanurate can be effectively used for the purpose of obtaining a pressure-sensitive adhesive layer with high transparency or high gel fraction. The polyvalent isocyanurate to be used may be a commercially available product such as DURANATE™ TPA-100 (hexamethylene diisocyanate) manufactured by Asahi Kasei Chemicals Corporation and CORONATE® HK hexamethylene diisocyanate), CORONATE® HX (hexamethylene diisocyanate), CORONATE® 2096 (hexamethylene diisocyanate) manufactured by Nippon Polyurethane Industry Co., Ltd.

The polyfunctional isocyanate compound is preferably, for example, a compound having at least two isocyanate groups per molecule. More preferably, the polyfunctional isocyanate compound is any compound having three or more isocyanate groups per molecule. Examples include aliphatic polyisocyanates, alicyclic polyisocyanates, aromatic polyisocyanates, and the like.

Examples of the aliphatic polyisocyanates include 1,2-ethylene diisocyanate, tetramethylene diisocyanates such as 1,2-tetramethylene diisocyanate, 1,3-tetramethylene diisocyanate, and 1,4-tetramethylene diisocyanate; hexamethylene diisocyanates such as 1,2-hexamethylene diisocyanate, 1,3-hexamethylene diisocyanate, 1,4-hexamethylene diisocyanate, 1,5-hexamethylene diisocyanate, 1,6-hexamethylene diisocyanate, and 2,5-hexamethylene diisocyanate; and 2-methyl-1,5-pentane diisocyanate, 3-methyl-1,5-pentane diisocyanate, and lysine diisocyanate.

Examples of the alicyclic polyisocyanates include isophorone diisocyanate; cyclohexyl diisocyanates such as 1,2-cyclohexyl diisocyanate, 1,3-cyclohexyl diisocyanate, and 1,4-cyclohexyl diisocyanate; cyclopentyl diisocyanates such as 1,2-cyclopentyl diisocyanate and 1,3-cyclopentyl diisocyanate; hydrogenated xylylene diisocyanate, hydrogenated tolylene diisocyanate, hydrogenated diphenylmethane diisocyanate, hydrogenated tetramethylxylene diisocyanate, and 4,4'-dicyclohexylmethane diisocyanate.

Examples of the aromatic polyisocyanates include 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, xylylene-1,4-diisocyanate, and xylylene-1,3-diisocyanate.

Besides the aliphatic, alicyclic, and aromatic polyisocyanates, examples of the polyfunctional isocyanate compound that may be used include dimers or trimers of aromatic aliphatic polyisocyanates, such as dimers or trimers of diphenylmethane diisocyanate, a reaction product of trimethylolpropane and tolylene diisocyanate, a reaction product of trimethylolpropane and hexamethylene diisocyanate, polymethylene polyphenyl iso cyanate, polyether-polyisocyanate, polyester-polyisocyanate, and other polymers.

Commercially available products of the polyfunctional isocyanate compound may also be used, examples of which include CORONATE L (trade name, manufactured by Nippon Polyurethane Industry Co., Ltd.) as a trimer adduct of trimethylolpropane and tolylene diisocyanate, and CORONATE HL (trade name, manufactured by Nippon Polyurethane Industry Co., Ltd.) as a trimer adduct of trimethylolpropane and hexamethylene diisocyanate.

Examples of the polyfunctional melamine compound include methylated methylolmelamine and butylated hexamethylolmelamine, and examples of the polyfunctional epoxy compound include diglycidyl aniline and glycerin diglycidyl ether.

The type and content of the crosslinking agent are not restricted. When formed using the crosslinking agent, the pressure-sensitive adhesive layer has a gel fraction of 15% by weight to less than 40% by weight, preferably 20 to 39% by weight, more preferably 25 to 39% by weight. The pressure-sensitive adhesive layer with a gel fraction of less than 15% by weight can fail to have sufficient holding power (cohesiveness). The pressure-sensitive adhesive layer with a gel fraction of more than 40% by weight is not preferred because it can have a high crosslink density and fail to have high adhering strength (adhesive strength). The pressure-sensitive adhesive layer with a gel fraction of less than 15% by weight or more than 40% by weight is also not suitable for double-sided tape applications and thus is not preferred.

The amount of the crosslinking agent is preferably from 0.5 to 30 parts by weight, more preferably from 1 to 15 parts by weight, based on 100 parts by weight of the polyester. If the amount is less than 0.5 parts by weight, it may be impossible to improve the holding power (cohesive strength)

of the pressure-sensitive adhesive layer, and the heat resistance may decrease. If the amount is more than 15 parts by weight, the crosslinking reaction may proceed excessively to reduce the adhering strength, which is not preferred. An amount of less than 0.5 parts by weight or more than 15 parts by weight is also not suitable for double-sided pressure-sensitive adhesive tape applications and is not preferred.

A crosslinking catalyst may be used as needed to efficiently control the gel fraction of the pressure-sensitive adhesive layer of the invention. Examples of the catalyst include tetra-n-butyl titanate, tetraisopropyl titanate, butyltin oxide, dioctyltin dilaurate, and the like. These catalysts may be used alone or in combination of two or more.

The amount of the catalyst is preferably, but not limited to, 0.01 to 1 part by weight, more preferably 0.05 to 0.5 parts by weight, based on 100 parts by weight of the polyester. If the amount is less than 0.01 parts by weight, the addition of the catalyst may fail to be effective, and if the amount is more than 1 part by weight, the pressure-sensitive adhesive may have a significantly short shelf-life and decrease in application stability, which is not preferred.

To extend the shelf life, a retarder such as acetyl acetone, methanol, or methyl orthoacetate may be added as needed.

<Tackifier>

The pressure-sensitive adhesive layer (pressure-sensitive adhesive tape) of the invention is made from a polyester-based pressure-sensitive adhesive composition including the polyester and a tackifier. When made from the tackifier-containing composition, the resulting pressure-sensitive adhesive layer can have the desired properties and be expected to have particularly improved adhesion (adherability) and repulsion resistance.

The tackifier is not restricted and may be of any conventionally-known type. In a more preferred mode, the tackifier includes a plant-derived raw material as a main component. Examples of the tackifier include a terpene tackifier, a phenolic tackifier, a rosin tackifier, an aliphatic petroleum resin, an aromatic petroleum resin, a copolymer-type petroleum resin, an alicyclic petroleum resin, a xylene resin, an epoxy tackifier, a polyamide tackifier, a ketone tackifier, an elastomeric tackifier, and the like. To improve the biomass ratio, it is particularly preferable to use a rosin or terpene tackifier produced from a plant-derived raw material. These tackifiers may be used alone or in combination of two or more.

Examples of the terpene-based tackifier include a terpene resin, a terpene phenol resin, and an aromatic modified terpene resin, and specific examples that may be used include an α-pinene polymer, a β-pinene polymer, a dipentene polymer, and modifications thereof, such as a phenol-modified terpene-based resin, an aromatic modified terpene-based resin, a hydrogenated modified terpene-based resin, and a hydrocarbon-modified terpene-based resin.

Examples of the phenol-based tackifier that may be used include condensation products of formaldehyde and any of various phenols such as phenol, m-cresol, 3,5-xylenol, p-alkylphenol, and resorcin. Further examples that may be used include resols obtained by addition reaction of formaldehyde and any of the phenols in the presence of an alkali catalyst; novolac resins obtained by condensation reaction of formaldehyde and any of the phenols in the presence of an acid catalyst; and rosin-modified phenolic resins obtained by addition reaction of phenol with any of rosins such as unmodified or modified rosin and derivatives thereof and thermal polymerization of the addition product.

Examples of the rosin-based tackifier include a rosin resin, a polymerized rosin resin, a hydrogenated rosin resin, a rosin ester resin, a hydrogenated rosin ester resin, and a rosin phenol resin. Specific examples that may be used include unmodified rosin (raw rosin) such as gum rosin, wood rosin, or tall oil rosin, modified rosin obtained by hydrogenation, disproportionation, polymerization, or any other chemical modification thereof, and derivatives thereof.

In particular, the tackifier preferably has a softening point of 100 to 170° C., more preferably 110 to 165° C., even more preferably 120 to 165° C., as measured by ring and ball method. When the softening point falls within these ranges, adhesion and repulsion resistance can be improved at the same time, which is preferred.

The amount of the tackifier is preferably 20 to 90 parts by weight, more preferably 25 to 88 parts by weight, even more preferably 30 to 88 parts by weight, further more preferably 35 to 86 parts by weight, based on 100 parts by weight of the polyester. If the amount is more than 90 parts by weight, the adhering strength (adhesive strength) may decrease, which is not preferred.

As long as the properties of the pressure-sensitive adhesive layer (pressure-sensitive adhesive) of the invention are not impaired, a common additive may be used, such as a silane coupling agent, a surface lubricant, a leveling agent, an antioxidant, a polymerization inhibitor, an ultraviolet absorber, a light stabilizer, a release modifier, a plasticizer, a softening agent, an inorganic or organic filler, a colorant such as a pigment or a dye, an age resistor, a surfactant, a metal powder, or a particulate or flaky material.

The thickness of the pressure-sensitive adhesive layer (after drying) may be selected as appropriate. For example, the pressure-sensitive adhesive layer (after drying) preferably has a thickness of about 1 to about 150 μm, more preferably about 3 to about 100 μm, even more preferably about 5 to about 60 μm. If the pressure-sensitive adhesive layer has a thickness of less than 1 μm, sufficient adhering strength (adhesive strength) can be difficult to obtain, and the pressure-sensitive adhesive tape (pressure-sensitive adhesive layer) itself may fail to be secured or may easily peel off. If the thickness is more than 150 μm, thickness accuracy may decrease and variations in thickness may easily occur during the coating process, which is not preferred. The pressure-sensitive adhesive layer may have a single-layer or multilayer structure.

The pressure-sensitive adhesive tape of the invention preferably includes the polyester-based pressure-sensitive adhesive layer and a support provided on at least one side of the polyester-based pressure-sensitive adhesive layer. The double-sided pressure-sensitive adhesive tape of the invention preferably includes at least two layers of the polyester-based pressure-sensitive adhesive and a support that is provided on at least one side of the polyester-based pressure-sensitive adhesive layer. With a support provided on at least one side of the pressure-sensitive adhesive layer, the pressure-sensitive adhesive tape or the double-sided pressure-sensitive adhesive tape can have improved mechanical strength or improved workability, which is a preferred mode.

<Support>

The support may be of any conventionally known type, such as a plastic film, a paper sheet, a porous material such as a nonwoven fabric, or any of various other supports (backings). A plastic film is preferably used in view of durability or the like. The plastic film may be, for example, a film of polyolefin such as polyethylene, polypropylene, poly-1-butene, poly-4-methyl-1-pentene, an ethylene-propylene copolymer, an ethylene-1-butene copolymer, an ethylene-vinyl acetate copolymer, an ethylene-ethyl acrylate copolymer, or an ethylene-vinyl alcohol copolymer, a film of polyester such as polyethylene terephthalate, polyethylene naphthalate, or polybutylene terephthalate, a polyacrylate film, a polystyrene film, a film of polyamide such as nylon 6, nylon 6,6, or partially aromatic polyamide, a polyvinyl chloride film, a polyvinylidene chloride film, a polycarbonate film, or the like. A support made of polylactic acid or cellulose obtained from plant-derived raw materials is preferably used because it can increase the total biomass ratio of the pressure-sensitive adhesive tape (or double-sided pressure-sensitive adhesive tape).

If necessary, the support may contain any of various additives used in backings (supports) for general pressure-sensitive adhesive tapes, such as an ultraviolet absorber, a light stabilizer, an antioxidant, an antistatic agent, a filler, a pigment, and a dye.

If necessary, the surface of the support may be subjected to a common surface treatment for improving its adhesiveness to the pressure-sensitive adhesive layer, such as a chromic acid treatment, exposure to ozone, exposure to flame, exposure to high-voltage electric shock, an ionizing radiation treatment or other chemical or physical oxidation treatments, or a coating treatment with a priming agent. The surface of the support may also be subjected to an antifouling treatment with silica powder or an antistatic treatment of a coating, kneading, or vapor-deposition type.

When used to form the pressure-sensitive adhesive tape or the double-sided pressure-sensitive adhesive tape of the invention, the support may also have an intermediate layer or an undercoat layer with no problem as long as the properties of the support are not impaired.

The thickness of the support may be appropriately selected depending on the material or shape of the support. For example, the support preferably has a thickness of 1,000 μm or less, more preferably about 1 to about 1,000 μm, even more preferably about 2 to about 500 μm, further more preferably about 3 to about 300 μm, still more preferably about 5 to about 250 μm.

The pressure-sensitive adhesive layer may be formed using any conventionally known method. For example, the pressure-sensitive adhesive layer may be formed according to a known method for producing a pressure-sensitive adhesive tape (pressure-sensitive adhesive sheet), such as a method that includes applying the pressure-sensitive adhesive composition (a solution of the pressure-sensitive adhesive composition in a solvent or a hot melt thereof) to the support and drying the composition to form a pressure-sensitive adhesive layer; a method that includes applying the pressure-sensitive adhesive composition to the support, drying the composition to form a pressure-sensitive adhesive composition layer, and further crosslinking it to form a pressure-sensitive adhesive layer; a method that includes forming a pressure-sensitive adhesive layer on a release liner by coating and then moving (transferring) the pressure-sensitive adhesive layer onto the support; a method of applying a pressure-sensitive adhesive layer-forming material to the support by extrusion; a method of extruding a support and a pressure-sensitive adhesive layer in two or more layers; or a method of laminating a single pressure-sensitive adhesive layer onto the support. The pressure-sensitive adhesive layer may also be formed using a method of co-extruding a thermoplastic resin support and a pressure-sensitive adhesive layer in two or more layers by inflation method or T-die method. As used herein, the term "pressure-sensitive adhesive tape" or "double-sided pressure-sensitive adhesive tape" is intended to include a pressure-sensitive adhesive film, a pressure-sensitive adhesive sheet, a support-free double-sided pressure-sensitive adhesive tape (pressure-sensitive adhesive layer alone), and a pressure-sensitive adhesive or double-sided pressure-sensitive adhesive tape containing a support.

The pressure-sensitive adhesive composition (solution) may be applied using a conventionally known method such as roll coating, gravure coating, reverse roll coating, roll brush coating, air knife coating, spray coating, or extrusion coating with a die coater or the like.

The pressure-sensitive adhesive layer of the invention is preferably provided with a release liner on at least one side of it. A release liner or liners provided on one or both sides of the pressure-sensitive adhesive layer can protect and preserve the surface of the pressure-sensitive adhesive layer until the pressure-sensitive adhesive layer (the pressure-sensitive adhesive tape or the double-sided pressure-sensitive adhesive tape) is used, and are also useful for workability and the like.

<Release Liner>

The release liner may be any conventionally-known appropriate release liner. For example, the release liner to be used may include a backing (a backing for a release liner) and a release coating layer that is formed on at least one side of the backing by a coating treatment with a parting agent (release agent) for imparting releasability, such as a silicone release agent, a fluoride release agent, a long-chain alkyl release agent, or a fatty acid amide release agent. The backing for the release liner may have a single-layer or multilayer structure.

Any of various thin materials such as plastic films, paper sheets, foamed products, and metal foils may be used as the release liner backing. A plastic film is particularly preferred. Examples of the material for the plastic film include polyester such as polyethylene terephthalate, polyolefin such as polypropylene or ethylene-propylene copolymer, and thermoplastic resin such as polyvinyl chloride. A plastic film including polylactic acid, polyester, or polyamide obtained from a plant-derived raw material is also preferably used.

The thickness of the release liner backing may be selected as appropriate, depending on the purpose.

The whole of the pressure-sensitive adhesive tape (or double-sided pressure-sensitive adhesive tape) of the invention (including all the components such as the pressure-sensitive adhesive layer, the support, and the release liner) preferably has a biomass ratio of 25% by weight or more, more preferably 30% by weight or more. With a biomass ratio of 25% by weight or more, the whole of the resulting pressure-sensitive adhesive tape (or double-sided pressure-sensitive adhesive tape) is environmentally compatible or friendly to the global environment, which is a preferred mode. As used herein, the term "biomass ratio" means the calculated ratio of the weight of the plant-derived raw material used in the production of the pressure-sensitive adhesive tape (or double-sided pressure-sensitive adhesive tape) to the total weight of the pressure-sensitive adhesive tape (or double-sided pressure-sensitive adhesive tape) (the total weight of all the raw materials used to form the components such as the pressure-sensitive adhesive layer and the support).

EXAMPLES

Hereinafter, the invention will be more specifically described with reference to examples, which however are not intended to limit the invention. In the examples, "parts" refers to "parts by weight," and "%" refers to "% by weight." Tables 1 to 3 show the components or composition of pressure-sensitive adhesive compositions, pressure-sensitive adhesive layers, pressure-sensitive adhesive tapes, and double-sided pressure-sensitive adhesive tapes, and the evaluation results.

<Preparation of Polyester A>

A three-necked separable flask equipped with a stirrer, a thermometer, and a vacuum pump was charged with 93.43 g of a dimer acid (Pripol 1009 (trade name) manufactured by Croda, 567 in molecular weight), 106.57 g of a dimer diol (2033 (trade name) manufactured by Croda, 537 in molecular weight), and 0.1 g of titanium tetraisopropoxide (manufactured by KISHIDA CHEMICAL Co., Ltd.) as a catalyst. The mixture was heated to 200° C. with stirring under a reduced-pressure atmosphere (2.0 kPa or less), and then this temperature was maintained. The reaction was continued for about 3 hours to produce polyester A, which had a weight average molecular weight (Mw) of 20,000.

The dimer acid and the dimer diol were used in such amounts that the amount of the hydroxyl group in the dimer diol was 1.20 moles per 1.00 mole of the carboxyl group in the dimer acid.

<Preparation of Polyester B>

Polyester B was obtained in the same way as for polyester A, except that the amount of the dimer acid was changed to 97.33 g and the amount of the dimer diol was changed to 102.67 g. Polyester B had a weight average molecular weight (Mw) of 28,000.

The dimer acid and the dimer diol were used in such amounts that the amount of the hydroxyl group in the dimer diol was 1.11 moles per 1.00 mole of the carboxyl group in the dimer acid.

Example 1-1

To 100 parts of polyester A were added 6 parts of hexamethylene diisocyanate (TPA-100 (trade name) manufactured by Asahi Kasei Chemicals Corporation) as a crosslinking agent and 80 parts of rosin ester (PENSEL D125 (trade name) manufactured by Arakawa Chemical Industries, Ltd.) as a tackifier. A pressure-sensitive adhesive composition (a pressure-sensitive adhesive solution) was prepared by adding toluene to the mixture so that a solids content of 70% would be reached. The pressure-sensitive adhesive composition was applied to the release-treated surface of a release-treated polyethylene terephthalate (PET) film (Diafoil MRF #38 (trade name) manufactured by Mitsubishi Plastics, Inc.) so that a 30-μm-thick coating would be formed after drying. The coating was dried at 120° C. for 3 minutes to form a pressure-sensitive adhesive layer. Subsequently, the pressure-sensitive adhesive layer was attached to the release-treated surface of a release-treated polyethylene terephthalate (PET) film (Diafoil MRE #38 (trade name) manufactured by Mitsubishi Plastics, Inc.). The resulting laminate was then allowed to stand at 40° C. for 3 days to give a pressure-sensitive adhesive tape.

Example 1-2

A pressure-sensitive adhesive tape was obtained as in Example 1-1, except that 3.5 parts of the crosslinking agent and 40 parts of the tackifier were added to 100 parts of polyester B.

Example 1-3

A pressure-sensitive adhesive tape was obtained as in Example 1-1, except that the tackifier was changed to another type of rosin ester (PENSEL D135 (trade name) manufactured by Arakawa Chemical Industries, Ltd.)

Example 1-4

A pressure-sensitive adhesive tape was obtained as in Example 1-1, except that 4 parts of the crosslinking agent and 40 parts of a tackifier (PENSEL D135 (trade name) manufactured by Arakawa Chemical Industries, Ltd.) were added to 100 parts of polyester B.

Example 1-5

A pressure-sensitive adhesive tape was obtained as in Example 1-3, except that the amount of the crosslinking agent was changed to 7 parts.

Example 1-6

A pressure-sensitive adhesive tape was obtained as in Example 1-5, except that the tackifier was changed to another type of rosin ester (PENSEL D160 (trade name) manufactured by Arakawa Chemical Industries, Ltd.).

Example 1-7

A pressure-sensitive adhesive tape was obtained as in Example 1-2, except that the amount of the crosslinking agent was changed to 2.5 parts and the tackifier was changed to 40 parts of terpene resin (YS Resin PX1205 (trade name) manufactured by YASUHARA CHEMICAL CO., LTD.).

Example 1-8

A pressure-sensitive adhesive tape was obtained as in Example 1-7, except that the tackifier was changed to 40 parts of hydrogenated terpene resin (Clearon P135 (trade name) manufactured by YASUHARA CHEMICAL CO., LTD.).

Comparative Example 1-1

A pressure-sensitive adhesive tape was obtained as in Example 1-1, except that the amount of the crosslinking agent was changed to 3.5 parts and no tackifier was added.

Comparative Example 1-2

A pressure-sensitive adhesive tape was obtained as in Example 1-1, except that the amounts of the crosslinking agent and the tackifier were changed to 4 parts and 30 parts, respectively.

Comparative Example 1-3

A pressure-sensitive adhesive tape was obtained as in Example 1-1, except that 3.0 parts of the crosslinking agent and no tackifier were added to 100 parts of polyester B.

Comparative Example 1-4

A pressure-sensitive adhesive tape was obtained as in Example 1-1, except that 2.5 parts of the crosslinking agent and 30 parts of the tackifier were added to 100 parts of polyester B.

Example 2-1

To 100 parts of polyester A were added 5.80 parts of hexamethylene diisocyanate (TPA-100 (trade name) manufactured by Asahi Kasei Chemicals Corporation) as a crosslinking agent and 80 parts of rosin ester (PENSEL D125 (trade name) manufactured by Arakawa Chemical Industries, Ltd.) as a tackifier. A pressure-sensitive adhesive was prepared by adding toluene to the mixture so that a solids content of 70% would be reached. The pressure-sensitive adhesive was applied to the release-treated surface of a release-treated polyethylene terephthalate (PET) film (Diafoil MRF #38 (trade name) manufactured by Mitsubishi Plastics, Inc.) so that a 30-μm-thick coating would be formed after drying. The coating was dried at 120° C. for 3 minutes to form a pressure-sensitive adhesive layer. Subsequently, the pressure-sensitive adhesive layer was attached to the release-treated surface of a release-treated polyethylene terephthalate (PET) film (Diafoil MRE #38 (trade name) manufactured by Mitsubishi Plastics, Inc.). The resulting laminate was then allowed to stand at 40° C. for 3 days to give a pressure-sensitive adhesive tape.

Example 2-2

A pressure-sensitive adhesive tape was obtained as in Example 2-1, except that 3.25 parts of the crosslinking agent and 40 parts of the tackifier were added to 100 parts of polyester B.

Example 2-3

A pressure-sensitive adhesive tape was obtained as in Example 2-1, except that the tackifier was changed to another type of rosin ester (PENSEL D135 (trade name) manufactured by Arakawa Chemical Industries, Ltd.) and the amount of the crosslinking agent was changed to 6.25 parts.

Example 2-4

A pressure-sensitive adhesive tape was obtained as in Example 2-1, except that 3.75 parts of the crosslinking agent and 40 parts of another type of rosin ester (PENSEL D135 (trade name) manufactured by Arakawa Chemical Industries, Ltd.) as the tackifier were added to 100 parts of polyester B.

Example 2-5

A pressure-sensitive adhesive tape was obtained as in Example 2-3, except that the amount of the crosslinking agent was changed to 6.50 parts.

Example 2-6

A pressure-sensitive adhesive tape was obtained as in Example 2-5, except that the tackifier was changed to another type of rosin ester (PENSEL D160 (trade name) manufactured by Arakawa Chemical Industries, Ltd.) and the amount of the crosslinking agent was changed to 6.75 parts.

Example 2-7

A pressure-sensitive adhesive tape was obtained as in Example 2-2, except that the tackifier was changed to 40 parts of terpene resin (YS Resin PX1205 (trade name) manufactured by YASUHARA CHEMICAL CO., LTD.) and the amount of the crosslinking agent was changed to 2.30 parts.

Example 2-8

A pressure-sensitive adhesive tape was obtained as in Example 2-7, except that the tackifier was changed to 40 parts of hydrogenated terpene resin (Clearon P135 (trade name) manufactured by YASUHARA CHEMICAL CO., LTD.) and the amount of the crosslinking agent was changed to 2.75 parts.

Comparative Example 2-1

A pressure-sensitive adhesive tape was obtained as in Example 2-1, except that the amount of the crosslinking agent was changed to 3.80 parts and no tackifier was added.

Comparative Example 2-2

A pressure-sensitive adhesive tape was obtained as in Example 2-1, except that the amounts of the crosslinking agent and the tackifier were changed to 3.75 parts and 30 parts, respectively.

Comparative Example 2-3

A pressure-sensitive adhesive tape was obtained as in Example 2-1, except that 2.80 parts of the crosslinking agent and no tackifier were added to 100 parts of polyester B.

Comparative Example 2-4

A pressure-sensitive adhesive tape was obtained as in Example 2-1, except that 3.00 parts of the crosslinking agent and 30 parts of the tackifier were added to 100 parts of polyester B.

Example 3-1

To 100 parts of polyester B were added 4 parts of hexamethylene diisocyanate (TPA-100 (trade name) manufactured by Asahi Kasei Chemicals Corporation) as a crosslinking agent and 40 parts of rosin ester (PENSEL D135 (trade name) manufactured by Arakawa Chemical Industries, Ltd.) as a tackifier. A pressure-sensitive adhesive composition (pressure-sensitive adhesive solution) was prepared by adding toluene to the mixture so that a solids content of 70% would be reached. The pressure-sensitive adhesive composition was applied to the release-treated surface of a release-treated polyethylene terephthalate (PET) film (Diafoil MRF #38 (trade name) manufactured by Mitsubishi Plastics, Inc.) so that a 19-μm-thick coating would be formed after drying. The coating was dried at 120° C. for 3 minutes to form a pressure-sensitive adhesive layer. The pressure-sensitive adhesive composition was also applied in the same way to another release-treated PET film (Diafoil MRE #38 (trade name) manufactured by Mitsubishi Plastics, Inc.), so that two pressure-sensitive adhesive layers were obtained. A 12-μm-thick PET film (Lumirror 12S10 (trade name) manufactured by PANAC Co., Ltd.) was sandwiched between the two pressure-sensitive adhesive layers. The resulting laminate was then allowed to stand at 40° C. for 3 days to give a pressure-sensitive adhesive tape (with a support).

Comparative Example 3-1

In a mixed solution of toluene and ethyl acetate [toluene/ethyl acetate=1/1 (in weight ratio)], 70 parts of n-butyl acrylate, 27 parts of 2-ethylhexyl acrylate, 3 parts of acrylic acid, 0.1 parts of 2-hydroxyethyl acrylate, and 0.2 parts of azobisisobutyronitrile as a polymerization initiator were subjected to solution polymerization for 6 hours to form an acryl-based polymer with a weight average molecular weight (Mw) of 500,000.

To 100 parts of the acryl-based polymer were added 2 parts of tolylene diisocyanate (CORONATE L (trade name) manufactured by Nippon Polyurethane Industry Co., Ltd.) as a crosslinking agent and 30 parts of a tackifier (PENSEL D125 (trade name) manufactured by Arakawa Chemical Industries, Ltd.). A pressure-sensitive adhesive was prepared by adding toluene to the mixture so that a solids content of 35% would be reached. The pressure-sensitive adhesive was applied to the release-treated surface of a release-treated PET film (Diafoil MRF #38 (trade name) manufactured by Mitsubishi Plastics, Inc.) so that a 19-μm-thick coating would be formed after drying. The coating was dried at 120° C. for 3 minutes to form a pressure-sensitive adhesive layer. The pressure-sensitive adhesive was also applied in the same way to another release-treated PET film (Diafoil MRE #38 (trade name) manufactured by Mitsubishi Plastics, Inc.), so that two pressure-sensitive adhesive layers were obtained. A 12-μm-thick PET film (Lumirror 12S10 (trade name) manufactured by PANAC Co., Ltd.) was sandwiched between the two pressure-sensitive adhesive layers. The resulting laminate was then allowed to stand at 40° C. for 3 days to give a pressure-sensitive adhesive tape (with a support).

(Weight Average Molecular Weight)

The weight average molecular weight (Mw) of each polymer (polyester) was determined by a gel permeation chromatography (GPC) method using a solution of the polymer in tetrahydrofuran (THF) and a calibration curve prepared with polystyrene standards.

(Measurement Conditions)
Analyzer: HLC-8220GPC manufactured by Tosoh Corporation
Sample concentration: 0.1% by weight (THF solution)
Sample injection volume: 20 μl
Eluent: THF
Flow rate: 0.300 ml/min
Measurement (column) temperature: 40° C.
Columns:
Columns for sample: TSKguard column Super HZ-L (single)+TSKgel Super HZM-M (double) manufactured by Tosoh Corporation Reference column: TSKgel Super H-RC (single) manufactured by Tosoh Corporation
Detector: differential refractometer (RI)

(Gel Fraction of Pressure-Sensitive Adhesive Layer)

The pressure-sensitive adhesive composition (pressure-sensitive adhesive solution) in each of the examples and the comparative example was applied to a release liner to form a pressure-sensitive adhesive layer with a thickness of 30 μm (the thickness obtained after the pressure-sensitive adhesive composition was dried and crosslinked). Subsequently, a 5 cm×5 cm square piece was cut from the resulting pressure-sensitive adhesive layer, and the release liner was removed. The resulting piece was used as a test piece.

The test piece was wrapped in a Teflon (registered trademark) sheet (simply referred to as the "sheet" in the formula below), whose weight had been measured, and then subjected to weighing. The wrapped test piece was allowed to stand in toluene at 23° C. for 7 days, and then the sol fraction was extracted from the test piece. Subsequently, the test piece was dried at 120° C. for 2 hours, and its dried weight was measured. The gel fraction of the sample was calculated from the following formula.

Gel fraction (% by weight)=100×(the weight after the drying−the weight of the sheet)/(the weight before the drying−the weight of the sheet)

The pressure-sensitive adhesive layer should have a gel fraction of 15% by weight or more to less than 40% by weight, preferably 20 to 39% by weight, more preferably 25 to 39% by weight. The pressure-sensitive adhesive layer with a gel fraction of less than 15% by weight may fail to have a desired retention (cohesive strength), and the pressure-sensitive adhesive layer with a gel fraction of more than 40% by weight may have a high crosslink density and fail to have a high adhering strength (adhesive strength), which are not preferred.

(Adhering Strength to Polycarbonate (PC) Plate)

One of the release-treated films was peeled off from the resulting pressure-sensitive adhesive tape. The exposed pressure-sensitive adhesive surface was then bonded to a 25-μm-thick polyethylene terephthalate (PET) film (Lumirror 25S10 (trade name) manufactured by PANAC Co., Ltd.) to form a sample. A 20-mm-wide piece was cut from the sample, and the other release-treated film was then peeled off. The exposed pressure-sensitive adhesive surface was then bonded to a polycarbonate plate (PC1600 (trade name) manufactured by Takiron Co., Ltd.) to form a test piece, which was measured for adhering strength (N/20 mm) to PC.

In the bonding process, pressure bonding was performed by reciprocating a 2 kg roller once. Thirty minutes after the bonding, the test piece was subjected to 180° peel adhering strength (adhesive strength) measurement with a tensile compression tester (TG-1 kN (tester name) manufactured by Minebea Co., Ltd.) under the following conditions.

Tension (peel) rate: 300 mm/minute
Measurement Conditions:
Temperature: 23±2° C.
Humidity: 65±5% RH The adhering strength (adhesive strength) to PC is preferably 7 N/20 mm or more, more preferably 7.5 N/20 mm or more, even more preferably 8 N/20 mm or more. An adhering strength of less than 7 N/20 mm is not preferred because it is too low so that fixing to curved surfaces and the like can be difficult to achieve.

(Adhering Strength to SUS Plate)

One of the release-treated films was peeled off from the resulting pressure-sensitive adhesive tape. The exposed pressure-sensitive adhesive surface was then bonded to a 25-μm-thick polyethylene terephthalate (PET) film (Lumirror 25S10 (trade name) manufactured by PANAC Co., Ltd.) to form a sample. A 20-mm-wide piece was cut from the sample, and the other release-treated film was then peeled off. The exposed pressure-sensitive adhesive surface was then bonded to a SUS 304 plate to form a test piece, which was measured for adhering strength (N/20 mm) to the SUS plate.

In the bonding process, pressure bonding was performed by reciprocating a 2 kg roller once. Thirty minutes after the bonding, the test piece was subjected to 180° peel adhering strength (adhesive strength) measurement with a tensile compression tester (TG-1 kN (tester name) manufactured by Minebea Co., Ltd.) under the following conditions.

Tension (peel) rate: 300 mm/minute
Measurement Conditions:
Temperature: 23±2° C.
Humidity: 65±5% RH The adhering strength (adhesive strength) to the SUS plate is preferably 6.5 N/20 mm or more, more preferably 6.8 N/20 mm or more, even more preferably 7 N/20 mm or more. An adhering strength of less than 6.5 N/20 mm is not preferred because it is too low so that it may cause the tape to peel off.

(Holding Power)

One of the release-treated films was peeled off from the resulting pressure-sensitive adhesive tape. The exposed pressure-sensitive adhesive surface was then bonded to a 25-μm-thick polyethylene terephthalate (PET) film (Lumirror 25S10 (trade name) manufactured by PANAC Co., Ltd.) to form a sample.

A 10-mm-wide, 100-mm-long piece was cut from the sample, and the other release-treated film was then peeled off. The exposed pressure-sensitive adhesive surface was then bonded to a 25-mm-wide, 125-mm-long, 2-mm-thick Bakelite plate to form a measurement piece. In the bonding process, the widthwise and longitudinal directions of the sample piece were aligned with those of the Bakelite plate, respectively, and the sample piece was pressure-bonded to a widthwise central part of the Bakelite plate by reciprocating a 2 kg roller once in such a way that they were lapped at a 10-mm-wide, 20-mm-long area. After the measurement piece was allowed to stand in a 40° C. atmosphere for 30 minutes, the sample piece was allowed to stand in a 40° C. atmosphere for 1 hour (60 minutes) while being loaded with 0.5 kg. Thereafter, the length (mm/60 minutes) of displacement of the sample piece was measured.

The holding power at 40° C. is preferably 0.8 mm/60 minutes or less, more preferably 0.5 mm/60 minutes or less, even more preferably 0.4 mm/60 minutes or less. If the holding power is more than 0.8 mm/60 minutes, the pressure-sensitive adhesive tape may slide significantly and fail to provide stable fixation for a long period of time, which is not preferred.

(Repulsion Resistance (Lifting Height))

A 10-mm-wide, 90-mm-long piece was cut from the resulting pressure-sensitive adhesive tape, and then one of the release-treated films was peeled off. The exposed pressure-sensitive adhesive surface was bonded to a 10-mm-wide, 90-mm-long, 0.3-mm-thick aluminum plate to form a sample. The sample was allowed to stand at room temperature for 24 hours.

The sample was shaped into an arc by bending it in the longitudinal direction (lengthwise direction) along a round bar with a diameter (φ) of 30 mm with its aluminum plate side placed inside. The other release-treated film was then peeled off from the sample, so that the pressure-sensitive adhesive surface was exposed. One longitudinal end (pressure-sensitive adhesive surface side) of the sample was preliminarily pressure-bonded to an adherend (polycarbonate plate), and then the sample was subjected to full pressure-bonding using a roll laminator (pressure-bonding conditions: 23° C., 0.3 m/minute). After the resulting laminate was allowed to stand at room temperature for 24 hours, the height (mm) of the sample end lifting from the surface of the adherend was measured. The heights of both lifting ends of the sample were averaged (N=2). The average was used as the "lifting height" (mm) for evaluation. It should be noted that it is preferable to use as many samples as possible when the average is calculated.

The smaller the lifting height is, the better the result of evaluation of the repulsion resistance (anti-repulsion properties) will be. The lifting height is preferably 10 mm or less, more preferably 8 mm or less, even more preferably 6 mm or less. If the lifting height is more than 10 mm, the pressure-sensitive adhesive tape may lift or peel from a curved surface or fail to provide stable fixation for a long period of time, which is not preferred.

A polycarbonate (PC) plate (width: 10 mm, length: 30 mm, thickness: 2 mm), a pressure-sensitive adhesive tape (width: 10 mm, length: 3 mm) obtained by cutting, and a polyethylene terephthalate film (PET film) (Lumirror 100510 (trade name) manufactured by PANAC Co., Ltd., width: 10 mm, length: 100 mm) were used to from a sample for evaluation. The PC plate and the PET film were bonded together with a pressure-sensitive adhesive.

The sample for evaluation was aged at 23° C. for 24 hours and further aged at 80° C. for 24 hours. Subsequently, the maximum distance between the surface of the polycarbonate plate and the interface between the PET film and the pressure-sensitive adhesive layer was measured with a digital microscope (VH-500 (trade name) manufactured by KEYENCE CORPORATION). The difference between the distances before and after the aging was evaluated as the final "lifting distance" (μm).

The smaller the lifting distance is, the better the result of evaluation of the repulsion resistance (anti-repulsion properties) will be. The lifting distance is preferably 180 μm or less, more preferably 150 μm or less, even more preferably 120 μm or less. If the lifting distance for the repulsion resistance is more than 180 μm, the pressure-sensitive adhesive tape may fail to stably secure an electronic device component or the like for a long period of time, which is not preferred.

TABLE 1

| Formulation and evaluation | Pressure-sensitive adhesive composition | | | | | | Pressure-sensitive adhesive layer Gel fraction Wt % | Adhering strength to PC N/20 mm | Holding power (40° C.) (length of displacement) mm/60 minutes | Repulsion resistance (lifting height) mm |
|---|---|---|---|---|---|---|---|---|---|---|
| | Polymer used | | Tackifier | | Crosslinking agent | | | | | |
| | Type | Amount (parts) | Type | Amount (parts) | | Amount (parts) | | | | |
| Example 1-1 | Polyester A | 100 | D125 | 80 | | 6.0 | 31.1 | 13.0 | 0.20 | 0.8 |
| Example 1-2 | Polyester B | 100 | D125 | 40 | | 3.5 | 37.4 | 11.3 | 0.15 | 4.4 |
| Example 1-3 | Polyester A | 100 | D135 | 80 | | 6.0 | 25.4 | 8.9 | 0.20 | 0.5 |
| Example 1-4 | Polyester B | 100 | D135 | 40 | | 4.0 | 35.6 | 10.3 | 0.27 | 0.3 |
| Example 1-5 | Polyester A | 100 | D135 | 80 | | 7.0 | 37.6 | 10.3 | 0.18 | 0.6 |
| Example 1-6 | Polyester A | 100 | D160 | 80 | | 7.0 | 38.6 | 8.0 | 0.23 | 5.4 |
| Example 1-7 | Polyester B | 100 | PX1205 | 40 | | 2.5 | 31.7 | 12.0 | 0.28 | 2.8 |
| Example 1-8 | Polyester B | 100 | P135 | 40 | | 2.5 | 38.0 | 10.5 | 0.23 | 3.1 |
| Comparative Example 1-1 | Polyester A | 100 | — | — | | 3.5 | 21.8 | 10.3 | 0.45 | 13.6 |
| Comparative Example 1-2 | Polyester A | 100 | D125 | 30 | | 4.0 | 2.3 | G | Fall | 12.8 |
| Comparative Example 1-3 | Polyester B | 100 | — | — | | 3.0 | 25.0 | G | 0.30 | 14.0 |
| Comparative Example 1-4 | Polyester B | 100 | D125 | 30 | | 2.5 | 1.6 | G | Fall | 13.0 |

Note:
G in Table 1 implies that cohesive failure occurred so that no exact value was available.

The evaluation results in Table 1 show that pressure-sensitive adhesive layers (pressure-sensitive adhesive tapes) having a desired level of adhesion, retention, and repulsion resistance are successfully obtained in Examples 1-1 to 1-8.

In contrast, the pressure-sensitive adhesive layers of Comparative Examples 1-1 and 1-3, where no tackifier was used, had reduced interfacial adhesiveness and low repulsion resistance. The pressure-sensitive adhesive layers of Comparative Examples 1-2 and 1-4 each with a very low gel fraction underwent cohesive failure and thus were not able to be evaluated for adhering strength. The pressure-sensitive adhesive layers of Comparative Examples 1-2 and 1-4 also had very low retention, so that the samples fell off, and showed very large values for repulsion resistance and were evaluated as being inferior to those of the examples.

TABLE 2

| Formulation and evaluation | Pressure-sensitive adhesive composition | | | | | Pressure-sensitive adhesive layer | Adhering strength | Holding power (40° C.) (length of displacement) | Repulsion resistance (lifting height) |
|---|---|---|---|---|---|---|---|---|---|
| | Polymer used | | Tackifier | | Crosslinking agent | | | | |
| | Type | Amount (parts) | Type | Amount (parts) | Amount (parts) | Gel fraction Wt % | to SUS N/20 mm | mm/60 minutes | mm |
| Example 2-1 | Polyester A | 100 | D125 | 80 | 5.80 | 30.2 | 12.5 | 0.25 | 1.0 |
| Example 2-2 | Polyester B | 100 | D125 | 40 | 3.25 | 35.2 | 9.4 | 0.15 | 4.2 |
| Example 2-3 | Polyester A | 100 | D135 | 80 | 6.25 | 26.7 | 13.0 | 0.18 | 0.6 |
| Example 2-4 | Polyester B | 100 | D135 | 40 | 3.75 | 34.1 | 8.9 | 0.25 | 0.5 |
| Example 2-5 | Polyester A | 100 | D135 | 80 | 6.50 | 36.5 | 10.6 | 0.15 | 0.4 |
| Example 2-6 | Polyester A | 100 | D160 | 80 | 6.75 | 37.4 | 7.4 | 0.20 | 4.2 |
| Example 2-7 | Polyester B | 100 | PX1205 | 40 | 2.30 | 30.9 | 10.0 | 0.33 | 2.9 |
| Example 2-8 | Polyester B | 100 | P135 | 40 | 2.75 | 39.2 | 9.1 | 0.35 | 3.3 |
| Comparative Example 2-1 | Polyester A | 100 | — | — | 3.80 | 23.3 | G | 0.45 | 13.6 |
| Comparative Example 2-2 | Polyester A | 100 | D125 | 30 | 3.75 | 2.1 | G | Fall | 13.2 |
| Comparative Example 2-3 | Polyester B | 100 | — | — | 2.80 | 24.7 | G | 0.25 | 15.5 |
| Comparative Example 2-4 | Polyester B | 100 | D125 | 30 | 3.00 | 1.8 | G | Fall | 12.3 |

Note:
G in Table 2 implies that cohesive failure occurred so that no exact value was available.

The evaluation results in Table 2 show that pressure-sensitive adhesive tapes having a desired level of adhesion, retention, and repulsion resistance are successfully obtained in Examples 2-1 to 2-8.

In contrast, the pressure-sensitive adhesive layers of Comparative Examples 2-1 and 2-3, where no tackifier was used, provided no interfacial adhesion, showed a large lifting height, and had low repulsion resistance. The pressure-sensitive adhesive layers of Comparative Examples 2-2 and 2-4 each with a very low gel fraction underwent cohesive failure and thus were not able to be evaluated for adhering strength. The pressure-sensitive adhesive layers of Comparative Examples 2-2 and 2-4 also had very low retention, so that the samples fell off, and showed very large lifting height values, had low repulsion resistance, and were evaluated as being inferior to those of the examples.

TABLE 3

| Formulation and evaluation | Pressure-sensitive adhesive composition | | | | | Pressure-sensitive adhesive layer | Adhering strength | Adhering strength | Holding power (40° C.) (length of displacement) | Repulsion resistance Lifting height |
|---|---|---|---|---|---|---|---|---|---|---|
| | Polymer used | | Tackifier | | Crosslinking agent | | | | | |
| | Type | Amount (parts) | Type | Amount (parts) | Amount (parts) | Gel fraction Wt % | to PC N/20 mm | to SUS N/20 mm | mm/60 minutes | mm |
| Example 3-1 | Polyester B | 100 | D135 | 40 | 4 | 34.6 | 9.2 | 7.4 | 0.20 | 1.5 |
| Comparative Example 3-1 | Acryl-based polymer | 100 | D125 | 30 | 2 | 27.5 | 12.8 | 13.3 | 0.20 | 13.1 |

The evaluation results in Table 3 show that a pressure-sensitive adhesive tape having a desired level of adhesion, retention, and repulsion resistance is successfully obtained in Example 3-1.

In contrast, the pressure-sensitive adhesive tape of Comparative Example 3-1, where no polyester-based pressure-sensitive adhesive was used and an acryl-based pressure-sensitive adhesive was used instead, provided no interfacial adhesion, showed a large lifting height, had low repulsion resistance, and was evaluated as being inferior to that of the example.

DESCRIPTION OF REFERENCE SIGNS

1 Release liner,
2 Pressure-sensitive adhesive layer,
3 Support,
10 Double-sided pressure-sensitive adhesive tape (with no support),
10' Double-sided pressure-sensitive adhesive tape (with a support), and
10" Pressure-sensitive adhesive tape (with a support).

The invention claimed is:

1. A polyester-based pressure-sensitive adhesive layer, comprising a product made from a polyester-based pressure-sensitive adhesive composition comprising: a polyester obtained by polycondensation of monomer components consisting of a dicarboxylic acid component and a diol component; and a tackifier,
   the polyester-based pressure-sensitive adhesive layer having a gel fraction of 15% by weight or more to less than 39% by weight,
   wherein the polyester-based pressure-sensitive adhesive layer has an adhering strength of 6.5 N/20 mm or more to a SUS plate,
   wherein the polyester-based pressure-sensitive adhesive layer has a single-layer structure, and
   wherein all of the polyester in said composition possesses a weight average molecular weight of 15,000 to 60,000.

2. The polyester-based pressure-sensitive adhesive layer according to claim 1, wherein the diol component contains 1.04 to 2.10 moles of hydroxyl groups per mole of carboxyl groups in the dicarboxylic acid component.

3. The polyester-based pressure-sensitive adhesive layer according to claim 1, wherein the dicarboxylic acid component and the diol component each comprise a plant-derived raw material as a main component.

4. The polyester-based pressure-sensitive adhesive layer according to claim 1, wherein
   the tackifier comprises a plant-derived raw material as a main component, and
   the tackifier has a softening point of 100 to 170° C.

5. The polyester-based pressure-sensitive adhesive layer according to claim 1, wherein the composition comprises 100 parts by weight of the polyester and 20 to 90 parts by weight of the tackifier.

6. The polyester-based pressure-sensitive adhesive layer according to claim 1, which has an adhering strength of 7 N/20 mm or more to a polycarbonate plate.

7. The polyester-based pressure-sensitive adhesive layer according to claim 1, which has a holding power of 0.8 mm/60 minutes or less at 40° C.

8. The polyester-based pressure-sensitive adhesive layer according to claim 1, further comprising a release liner provided on at least one side.

9. A polyester-based pressure-sensitive adhesive tape, comprising: the polyester-based pressure-sensitive adhesive layer according to claim 1; and a support provided on at least one side of the polyester-based pressure-sensitive adhesive layer.

10. A polyester-based double-sided pressure-sensitive adhesive tape, comprising:
    at least two polyester-based pressure-sensitive adhesive layers each according to claim 1; and
    a support provided on at least one side of the polyester-based pressure-sensitive adhesive layer.

11. The polyester-based pressure-sensitive adhesive layer according to claim 1, wherein the polyester-based pressure-sensitive adhesive layer has an adhering strength of 8.9 N/20 mm or more to a SUS plate.

* * * * *

UNITED STATES PATENT AND TRADEMARK OFFICE
CERTIFICATE OF CORRECTION

PATENT NO. : 10,287,465 B2
APPLICATION NO. : 14/772990
DATED : May 14, 2019
INVENTOR(S) : Akiko Tanaka Page 1 of 1

It is certified that error appears in the above-identified patent and that said Letters Patent is hereby corrected as shown below:

In the Specification

In Column 7, Line 53, change "hexamethylene" to --(hexamethylene--.

In Column 8, Line 34, change "iso cyanate," to --isocyanate,--.

Signed and Sealed this
Seventeenth Day of September, 2019

Andrei Iancu
*Director of the United States Patent and Trademark Office*